United States Patent
Iyengar et al.

(10) Patent No.: US 7,721,091 B2
(45) Date of Patent: May 18, 2010

(54) METHOD FOR PROTECTING AGAINST DENIAL OF SERVICE ATTACKS USING TRUST, QUALITY OF SERVICE, PERSONALIZATION, AND HIDE PORT MESSAGES

(75) Inventors: Arun K. Iyengar, Yorktown Heights, NY (US); Mudhakar Srivatsa, Atlanta, GA (US); Jian Yin, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 11/433,534

(22) Filed: May 12, 2006

(65) Prior Publication Data

US 2007/0266426 A1 Nov. 15, 2007

(51) Int. Cl.
H04L 29/06 (2006.01)
G06F 21/00 (2006.01)
(52) U.S. Cl. .......................... 713/166; 726/5
(58) Field of Classification Search ................. 380/200, 380/228, 229, 217; 713/150, 166; 726/3, 726/4, 11, 20, 26, 5, 7, 19
See application file for complete search history.

(56) References Cited

U.S. PATENT DOCUMENTS

| | | | | |
|---|---|---|---|---|
| 5,802,178 A | * | 9/1998 | Holden et al. | 713/151 |
| 5,832,228 A | * | 11/1998 | Holden et al. | 709/225 |
| 6,668,322 B1 | * | 12/2003 | Wood et al. | 713/182 |
| 7,383,433 B2 | * | 6/2008 | Yeager et al. | 713/157 |
| 2003/0014662 A1 | * | 1/2003 | Gupta et al. | 713/200 |
| 2003/0041255 A1 | * | 2/2003 | Chen et al. | 713/193 |
| 2003/0084172 A1 | * | 5/2003 | deJong et al. | 709/229 |
| 2003/0084288 A1 | * | 5/2003 | de Jong et al. | 713/168 |
| 2003/0140230 A1 | * | 7/2003 | de Jong et al. | 713/182 |
| 2004/0025018 A1 | * | 2/2004 | Haas et al. | 713/168 |
| 2004/0181665 A1 | * | 9/2004 | Houser | 713/158 |
| 2005/0166053 A1 | * | 7/2005 | Cui et al. | 713/176 |
| 2005/0257045 A1 | * | 11/2005 | Bushman et al. | 713/156 |

* cited by examiner

*Primary Examiner*—Gilberto Barron, Jr.
*Assistant Examiner*—Soheila Davanlou
(74) *Attorney, Agent, or Firm*—Michael J. Buchenhorner; Derek S. Jennings

(57) ABSTRACT

According to an embodiment of the invention, a method for processing a plurality of service requests in a client-server system includes server steps of receiving at least one request for service from a client and providing a level of service based on a trust level provided in the at least one request. According to another embodiment, a method of authenticating messages includes steps of: embedding authentication information into a message at the application level; downloading a script from a computer for sending the message; running said script to send said message to a server; and checking said message by said server at the network level.

5 Claims, 10 Drawing Sheets

NAT Port Forwarding to ensures that the response is sent using hide_port and not the actual dest_port

METHOD FOR PROTECTING AGAINST DENIAL OF SERVICE ATTACKS USING TRUST, QUALITY OF SERVICE, PERSONALIZATION, AND HIDE PORT MESSAGES

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information, and more particularly relates to a method and system for determining trust, quality of service, and personalization for clients using tokens.

BACKGROUND OF THE INVENTION

Recently, we have seen increasing activities of denial of service (DoS) attacks against online services and web applications to extort, disable or impair servers. Sophisticated DoS attacks are increasingly focusing not only on low level network flooding, but also on application level attacks that flood victims with requests that mimic flash crowds. Application level DoS attacks refer to those attacks that exploit application specific semantics and domain knowledge to launch a DoS attack such that it is very hard for any DoS filter to distinguish a sequence of attack requests from a sequence of legitimate requests. Two characteristics make application level DoS attacks particularly damaging. First, application level DoS attacks emulate the same request syntax and network level traffic characteristics as that of the legitimate clients, thereby making them much harder to detect. Second, an attacker can choose to send expensive requests targeting higher layer server resources like sockets, disk bandwidth, database bandwidth and worker processes.

There are two major problems in protecting an online e-Commerce website from application level DoS attacks. First, application level DoS attacks could be very subtle, making it very difficult for a DoS filter to distinguish between a stream of requests from a DoS attacker and a legitimate client. It would be very hard to distinguish DoS attack requests from the legitimate requests even if a DoS filter were to examine any statistics (mean, variance, etc.) on the request rate, the contents of the request packet headers (IP, TCP, HTTP, etc.) and even the entire content of the request packet itself. Further, the subtle nature of application level DoS attacks make it very hard to exhaustively enumerate all possible attacks that could be launched by an adversary. Hence, there is a need to defend against application level DoS attacks without knowing their precise nature of operation.

One way to defend from DoS attacks is to permit only preauthorized clients to access the web server. Preauthorization can be implemented using SSL (secure sockets layer) or IPSec (IP security or IPSEC) with an out-of-band mechanism to establish a shared key between a preauthorized client and the web server. Now, any packets from a non-preauthorized client can be filtered at a firewall. However, requiring preauthorization may deter clients from using the online service. Also, for an open e-Commerce website like eBay or Amazon, it may not be feasible to make an exhaustive list of all clients that should be authorized to access the service. Further, it would be very hard to ensure all authorized clients will behave benignly. A DoS attack from a small subset of preauthorized clients may render the server unusable.

Challenge-based mechanisms provide an alternative solution for DoS protection without requiring preauthorization. A challenge is an elegant way to throttle the intensity of a DoS attack. For example, an image-based challenge (Turing test) may be used to determine whether the client is a real human being or an automated script. A cryptographic challenge [see X. Wang and M. Reiter, "Mitigating Bandwidth Exhaustion Attacks Using Congestion Puzzles," Proceedings of ACM CCS, 2004] may be used to ensure that the client pays for the service using its computing power. However, most challenge mechanisms make both the good and the bad clients pay for the service, thereby reducing the throughput and introducing inconvenience for the good clients as well. For instance, an image-based challenge does not distinguish between a legitimate automated client script and a DoS attack script.

An effective solution to defend against DoS attacks is to filter attack requests at the earliest point (say, the website's firewall), before it consumes much of the server's resources. The attack requests arrive from a large number of geographically distributed machines, and thus cannot be filtered on the IP prefix. Some websites require password and login information before a client can access the website. However, checking the site-specific password requires establishing a connection and allowing unauthenticated clients to access socket buffers and worker processes, making it easy to mount an attack on the authentication mechanism itself. Some sites use strong digital signature based transport level authentication mechanisms [e.g., secure sockets layer, SSL]; however, the complex server-side computations required for verifying a digital certificate allow an adversary to target the handshake protocol for launching DoS attacks. In general, authentication mechanisms that operate at a higher layer in the networking stack allow an attacker to target lower layers.

Some websites may use message authentication codes (MAC) based IP level authentication mechanisms like IPSec. IPSec with preconfigured keys allows packets from unauthenticated clients to be dropped by the firewall. Hence, unauthenticated clients cannot access even low level server resources like socket buffers and transmission control blocks (TCBs). However, IPSec breaks client transparency in several ways: (i) Installing IPSec requires changes to the client-side networking stack, (ii) Installing IPSec requires superuser privileges at the client, (iii) IPSec permits both manual key set up and key exchange using the Internet key exchange protocol (IKE). The IKE protocol uses the Diffie-Hellman key exchange protocol. Similar to digital signatures, this protocol imposes a heavy computational load on the server, thereby allowing an adversary to target the IKE protocol for launching DoS attacks. (iv) Manually setting up shared keys circumvents the expensive IKE protocol. However, manual IPSec key setup requires superuser privileges at the client.

There is an inherent conflict between using client authentication for defending against DoS attacks and client transparency. It appears that an effective defense against DoS attacks must operate at lower layers in the networking stack so that the firewall can filter a packet before it can consume much resources at the server. On the other hand, introducing an authentication header at lower layers in the networking stack annuls client transparency, usually by requiring changes to the client-side network stack and by requiring superuser privileges at the client. Therefore, there is a need for a solution that overcomes the aforementioned shortcomings.

SUMMARY OF THE INVENTION

According to an embodiment of the invention, a method for processing a plurality of service requests in a client-server system includes server steps of receiving at least one request for service from a client and providing a level of service based on a trust level provided in the at least one request. According to another embodiment, a method of authenticating messages includes steps of: embedding authentication information into a message at the application level; downloading a script from a computer for sending the message; running said script to send said message to a server; and checking said message by said server at the network level.

DETAILED DESCRIPTION

Figure 1:
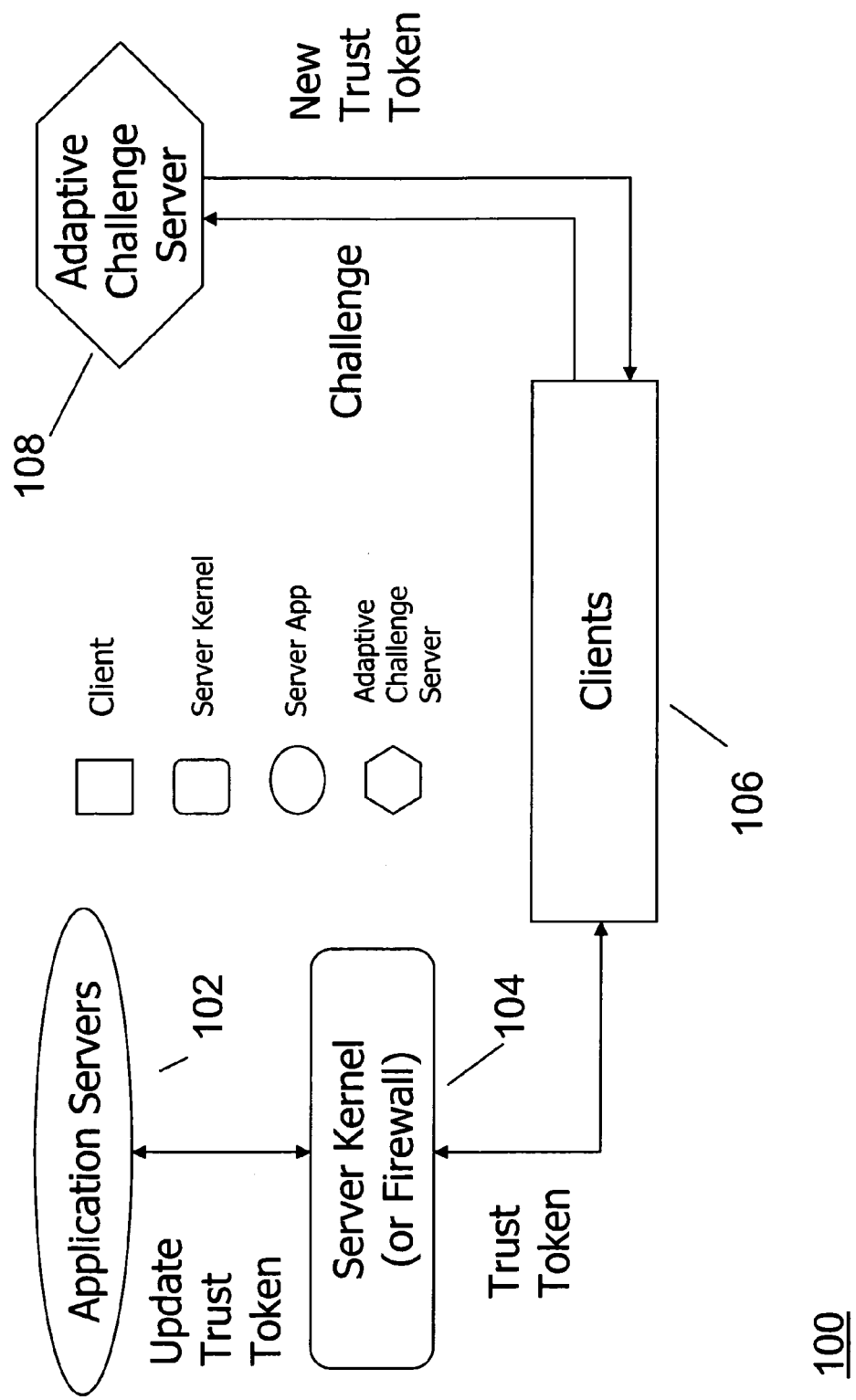
FIG. 1 shows a high level architecture of an embodiment of the invention.

According to an embodiment of the invention, a mechanism protects an online e-Commerce website against application level DoS attacks. Our mechanism does not attempt to distinguish a DoS attack request from the legitimate ones. Instead, our mechanism examines the amount of resources expended by the server in handling a request, rather than the request itself. We use the utility of a request and the amount of server resources incurred in handling the request to compute a score for every request. We construct a feedback loop that takes a request's score as its input and updates the client's priority level. In its simplest sense, the priority level might encode the maximum number of requests per unit time that a client can issue. Hence, a high scoring request increases a client's priority level, thereby permitting the client to send a larger number of requests per unit time. On the other hand, a low scoring request decreases a client's priority level, thereby limiting the number of requests that the client may issue per unit time. Therefore, application level DoS attack requests that are resource intensive and have low utility to the e-commerce website would decrease the attacker's priority level. As the attacker's priority level decreases, the intensity of its DoS attack decreases.

Our approach to guard an online service against application level DoS attacks has several benefits: An obvious benefit that follows from the description of our DoS protection mechanism is that it is independent of the attack's precise nature of operation. As pointed out above it is in general difficult to predict, detect, or enumerate all the possible attacks that may be used by an attacker. A mechanism that is independent of the attack type can implicitly handle intelligent attackers that adapt and attack the system. Indeed any adaptation of an application level DoS attack would result in heavy resource consumption at the server without any noticeable changes to the request's syntax or traffic characteristics. Our mechanism does not distinguish requests based on the request rate, the packet headers, or the contents of the request. It is very hard to distinguish an attack request from the legitimate ones using either the request rate or the contents of the request.

This embodiment comprises a request throttling mechanism that allocates more server resources to the legitimate clients, while severely throttling the amount of server resources allocated to the DoS attackers. This is achieved by adaptively setting a client's priority level in response to the client's requests, in a way that can incorporate application level semantics. We provide a simple application programming interface (API) that permits an application programmer to use our DoS protection mechanism. The proposed solution does not require the clients to be preauthorized. The absence of preauthorization implies that the server does not have to establish any out-of-band trust relationships with the client. Our proposed solution is client transparent; that is, a user or an automated client side script can browse a DoS protected website in the same way as it browsed an unprotected website. Our DoS protection mechanisms do not require any changes to the client side software or require super user privileges at the client. All instrumentations required for implementing our proposal can be incorporated on the server side. Our instrumentation can be modularly divided between the server side firewall (IP layer) and the application layer.

An embodiment of the invention comprises a detailed implementation of the solution on the Linux kernel. We now discuss two examples of application level DoS attacks, showing existing approaches for DoS protection, and highlighting the deficiencies of those approaches in defending against application level DoS attacks.

A long sequence of HTTP requests that attempt to pull out large image files from an e-Commerce website can constitute a simple application level DoS attack. In this case, the attackers (a collection of zombie machines) send the HTTP requests at the same rate as a legitimate client. Hence, a DoS filter may not be able to detect whether a given request is a DoS attack request by examining the packet's headers, including the IP, the TCP and the HTTP headers. In fact, the rate of attack requests and the attack request's packet headers would be indistinguishable from the requests sent by well-behaved clients.

A DoS filter that examines the HTTP request URL may be able to distinguish DoS attackers that request a large number of image files from that of the good clients. However, the attackers could attack a web application using more subtle techniques. For example, most online e-Commerce applications use a database server to guarantee persistent operations. Given an HTTP request, the application logic transforms the request into one or more database queries. The cost of a database query not only depends on the type of the query, but also depends on the query arguments. For instance, an HTTP request may require an exhaustive search over the entire database or may require a join operation to be performed between two large database tables. This makes it very hard for a DoS filter to detect whether a given request is a DoS attack request by examining the packet's headers and all its contents. In fact, the rate of attack requests and the attack request's packet headers and contents would be indistinguishable from those sent by any well-behaved client unless the entire application logic is encoded in the DoS filter. However, this could make the cost of request filtering almost as expensive as the cost of processing the actual application request itself. Indeed a complex DoS filter like this could by itself turn out to be a target for the attackers.

We assume that the adversary can spoof the source IP address. We also assume that the adversary has a large but bounded number of IP addresses under its control. If an IP address is controlled by the adversary, then the adversary can both send and receive packets from that IP address. We assume that the adversary can neither observe nor modify the traffic to a client whose IP address is not controlled by the adversary. However, the adversary can always send packets with a spoofed source IP address that is not essentially controlled by the adversary. We also assume that the adversary has large, but bounded amounts of networking and computing resources at its disposal and thus cannot inject arbitrarily large numbers of packets into the IP network. We assume that the adversary can coordinate activities perfectly to take maximum advantage of its resources.

FIG. 1 shows a high level architecture of a system 100. The system 100 includes one or more application servers 102. A server kernel (or firewall) 104 is coupled to the server 102. Clients are represented by block 106. The clients 106 are also connected to an adaptive challenge server 108. Our approach allocates more server resources to good clients, while severely limiting the amount of resources expended on DoS attackers. The maximum amount of resources allocated to a client is represented by the client's quality of service (QoS) level. We use trust tokens to encode the QoS level that a client is eligible to receive. Although our architecture is capable of supporting arbitrary QoS policies, for the sake of simplicity, we characterize a client's QoS level exclusively by its priority level (a totally ordered numeric value). A client's trust token is embedded in a standard HTTP cookie that is included in all responses from the server to the client. Using the standard cookie semantics, a legitimate client would include the trust token in all its future requests to the server. A client presenting a valid trust token to the server would be served at the priority level encoded in the token. Otherwise, the client's request would be dropped at the server's IP layer or firewall.

A client's priority level is used to rate limit its requests at the server's IP layer or the firewall. We use an IP level packet filter to filter HTTP requests from the clients. The packet filter uses weighted fair queuing [I. Stoica, S. Shenker and H. Zhang, "Core-Stateless Fair Queuing: A Scalable Architecture to Approximate Fair Bandwidth Allocations in High Speed Networks," Proceedings of ACM SIGCOMM, 1998] to throttle a client's request rate based on the client's priority level. Hence, requests from attackers attempting to issue a disproportionately large number of requests (relative to their priority level) are dropped at the IP layer or the firewall 104 itself. Filtering requests at the IP layer significantly reduces the amount of processor, memory, network, and disk resources expended on that request.

A client's priority level is adaptively varied by the application using application specific semantics and domain knowledge. For this purpose, we provide a simple and flexible API for application programmers. We describe the concrete API with three sample implementations in Section\ref{impl}. Allowing the application to set a client's priority level permits us to incorporate application specific semantics (domain knowledge) and is thus highly flexible. IP level (firewall) level request filtering ensures that illegitimate requests are dropped before they can consume much of the server's resources. In this embodiment we explore several algorithms which could be used to vary the client's priority level and study its effect on the performance of the web server.

Trust tokens are bootstrapped using an initial trust token issued by the challenge server 108 when the client first attempts to access the web server. The trust token is encrypted in such a way that it would be computationally infeasible for a client to undetectably modify the token. We ensure the priority level of a client is kept up to date; since the priority level of a client is continuously varied it is very important that the server retains the most recent value of a client's priority level, especially if the client's priority level is dropping.

This embodiment is client transparent and requires no changes to the client side software. All our instrumentation is done at the server side thereby making the deployment very easy. The instrumentation at the server side includes the following components.

The challenge server 108 is used to bootstrap the system. The challenge server 108 is responsible for initializing the trust token that encodes a client's initial priority level. Note that the challenge server 108 itself should be protected against DoS attackers. We use a cryptographic challenge-based defense mechanism to protect the challenge server 108. When a client solves a cryptographic challenge correctly, then the challenge server 108 would provide the client with an appropriate trust token. We ensure that solving the cryptographic challenge is several orders of magnitude costlier than generating and initializing the trust token.

The IP layer 104 at the server 102 is modified to use the client's priority level to filter HTTP requests sent by a client. The priority level is enforced by fair queuing requests at the IP level. Filtering requests at the IP layer saves a lot of computing and memory resources that are otherwise expended on the request as it traverses up the server's network stack.

The application layer at the server 102 is modified to use application specific rules to update a client's priority level. The client's new priority level is computed using a utility-based model that considers the set of recent requests sent by the client and the amount of server resources consumed by these requests.

Figure 2:
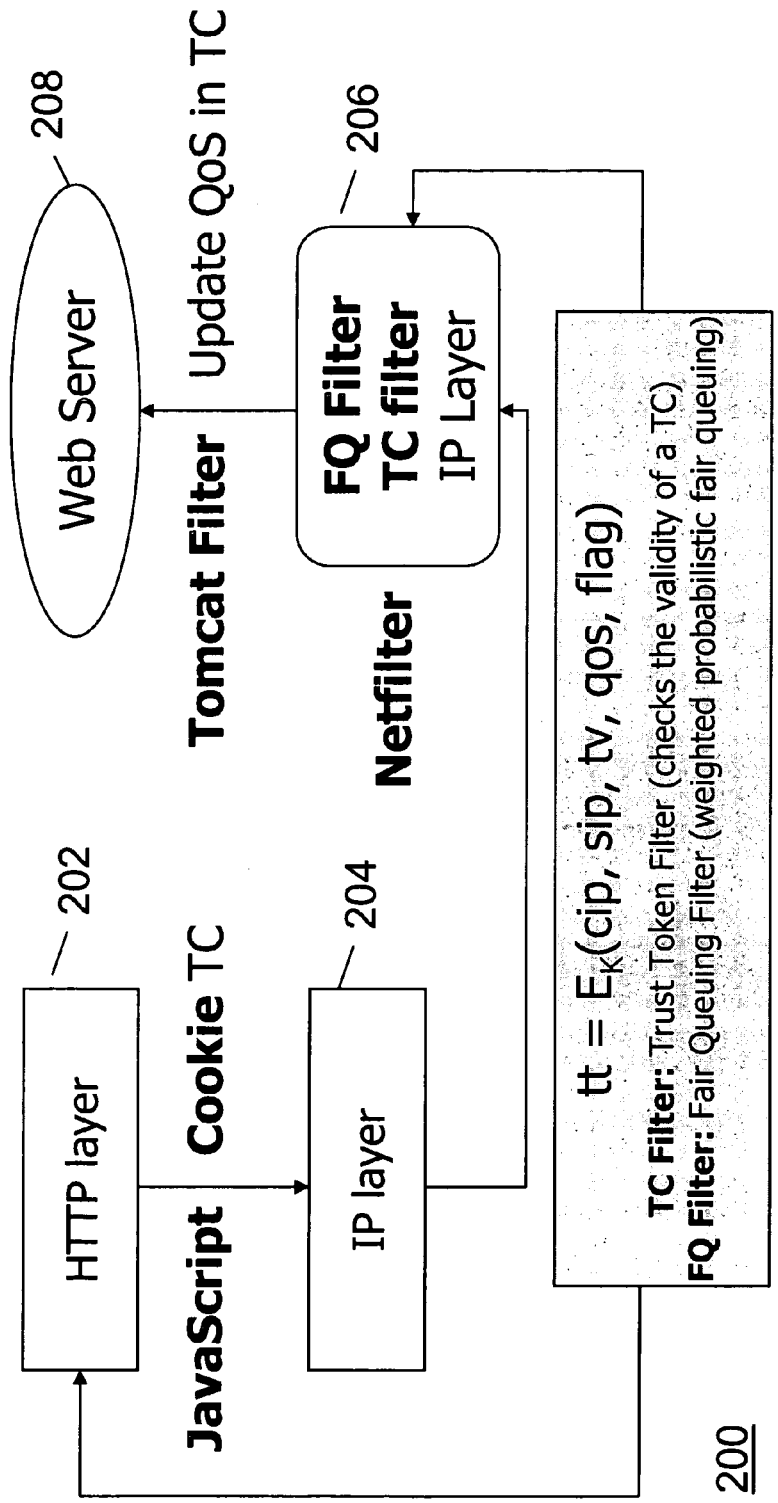
FIG. 2 is a high level block diagram showing construction of a trust cookie.

Referring to FIG. 2, we now discuss how a trust token is constructed. Then, in FIGS. 3 and 4 we describe techniques to use the trust token to defend against application level DoS attacks. In FIG. 2 there is shown an architecture 200 for building a trust cookie. An HTTP layer 202 provides a Javascript cookie to an IP layer 204 which builds the rest of the trust cookie (TC). An FQ filter/TC filter/IP layer 206 receives the TC and passes it to a web server 208 to update the QoS in the TC.

A 16-Byte long trust token (tt) is constructed as follows: tt=E_MK(cip, sip, tv, prio, flag), where cip (4 Bytes) denotes the client's IP address, sip (4 Bytes) denotes the server's IP address, tv (4 Bytes) denotes the time at which the trust token was issued (time is expressed as the number of seconds from 1 Jan. 1970), prio (2 Bytes) denotes the priority level assigned to the client by the server, flag (2 Bytes) denotes a sentinel, MK denotes a secret cryptographic key used by the server and E denotes a symmetric key encryption algorithm. A priority level of zero indicates that all requests from the client would be dropped by the server.

Figure 3:
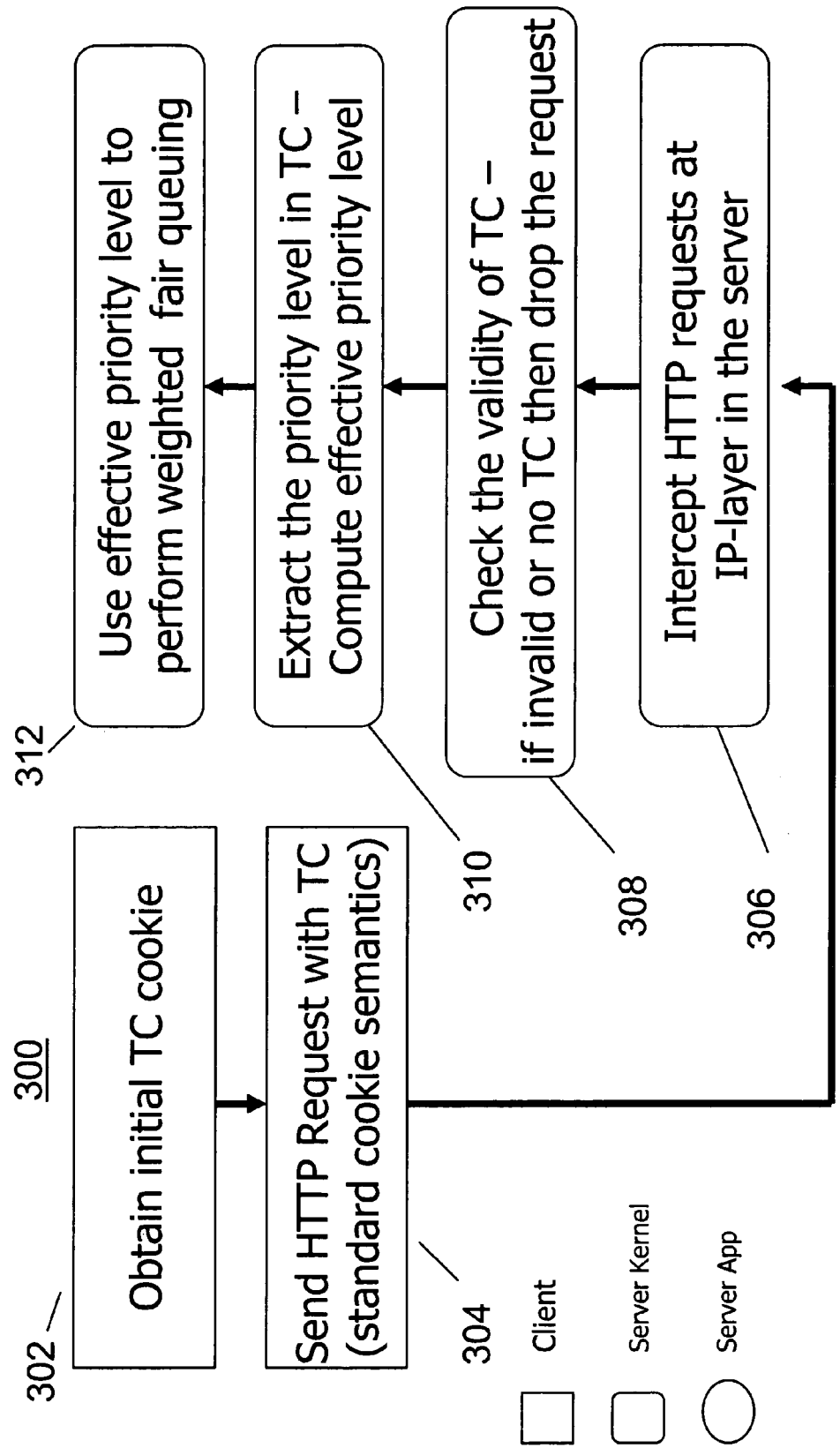
FIGS. 3 and 4 show the control flow of a trust cookie.

Referring to FIG. 3, there is shown a process 400 wherein a legitimate client operates as follows. In step 302 a client obtains its token tt when it solves a challenge. The token is stored as an HTTP cookie in the client's browser. The client includes the token tt in all its HTTP requests to the server in step 304.

On the server-side firewall 104, we perform two operations. First, in step 306 we filter HTTP requests based on the validity of the trust token. Second, in step 308 we check whether the trust token is valid, if it is invalid or no TC is present, then the request is dropped. If it is valid the server 102 extracts the client's priority level and throttles the client's request rate using fair queuing (step 310). Then in step 312 we use the effective priority weighted fair queuing.

The server 102 checks if the packet is an HTTP request and if so, it extracts the HTTP cookie tt. It validates the trust token tt as follows. A trust token tt is valid if the tt.cip matches the client's IP address, and the tt.sip matches the server's IP address, and the tt.tv is some time in the past (tt.tv<cur_time), and the tt.flag matches the sentinel. If so, the server extracts the priority level (tt.prio) from tt; else the request is dropped by the firewall.

An adversary may behave benignly until it attains a high priority level and then begin to misbehave. Consequently, the server would issue a trust token with a lower priority level. However, the adversary may send an old trust token (with high priority level) to the server in its future requests. If all responses from the server to the client were tunneled via the firewall, then the firewall can record the client's updated priority level. However, for performance reasons, most application servers are configured in a way that requests are tunneled via the firewall but not the responses. Under such a scenario, we prevent a DoS attack by computing the effective priority level as follows.

The server 102 uses the request's priority level prio, the time of cookie issue (tt.tv) and the client's request rate r to compute the effective priority level eprio as follows: eprio=prio*e−δ*max(cur_time−tt.tv−1/r, 0), where cur_time denotes the current time. The key intuition here is that if cur_time−tt.tv is significantly larger than the client's mean inter request arrival time (1/r) then the client is probably sending an old trust token. The larger the difference between (cur_time−tt.tv) and 1/r, the more likely it is that the client is attempting to send an old token. Hence, we drop the effective priority level eprio exponentially with the difference between (cur_time−tt.tv) and 1/r. Note that the fair queuing filter estimates the client's request rate r for performing weighted probabilistic fair queuing.

Having validated the trust token and extracted its priority level, the server 102 uses eprio to perform weighted probabilistic fair queuing on all incoming HTTP requests from the client. Fair queuing limits the maximum request rate from a client to its fair share. Hence, requests from an attacker attempting to send requests at a rate larger than its fair share is dropped by the firewall 104. We set a client's fair share to be in proportion to its effective priority level. Hence, if a client has a low priority level, then only a very small number of requests from the client actually reach the web server 102.

Figure 4:
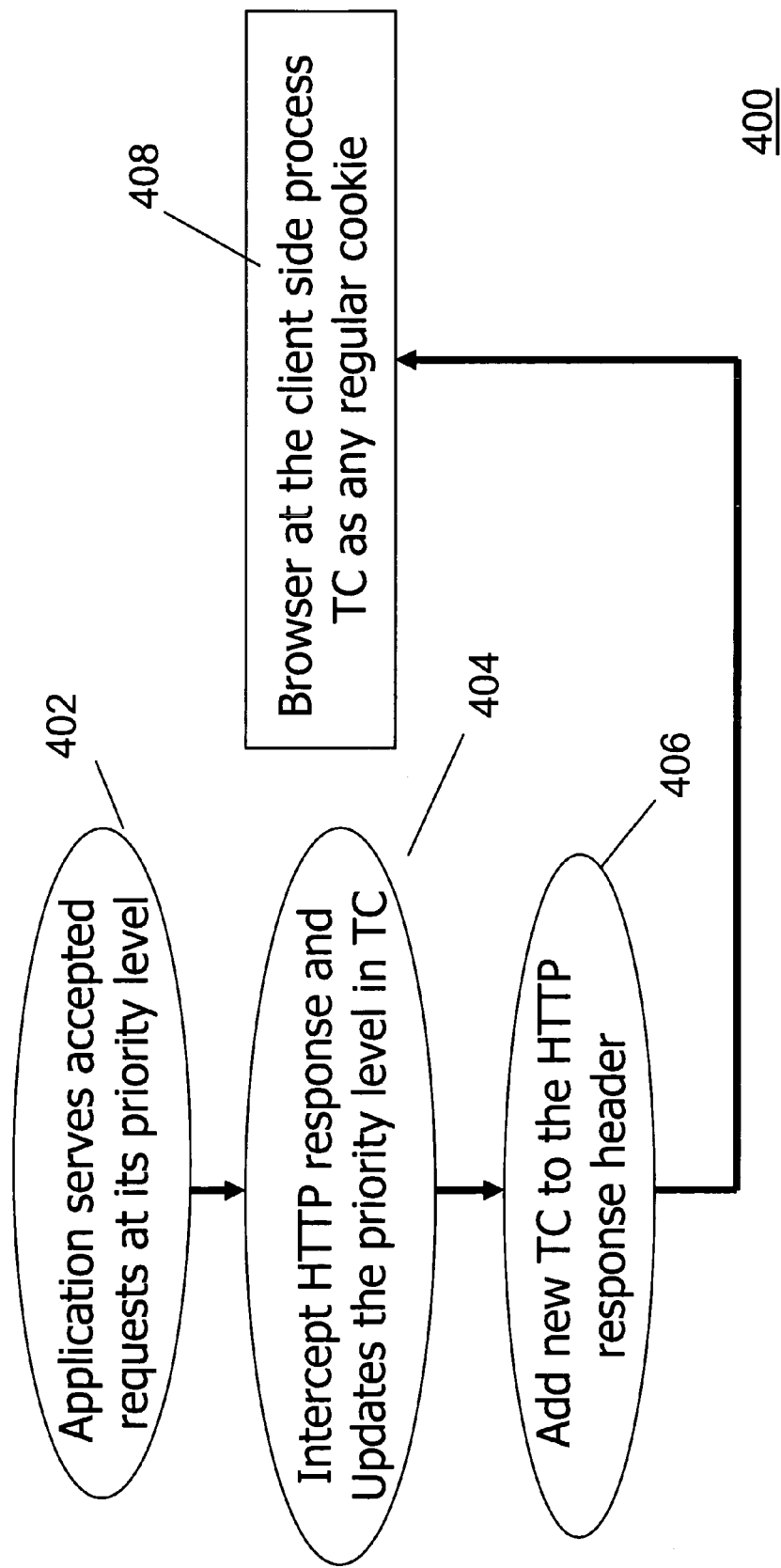

Referring to FIG. 4, there is shown a trust cookie control flow process 400. In step 402 an application serves accepted requests at its priority level. In step 404 the server intercepts an HTTP response and updates the priority level in the TC. In step 406 the server application adds a new TC to the HTTP response header. Then in step 408, the client browser processes the TC as any regular cookie.

We now discuss techniques to ensure that DoS attackers are assigned low priority levels, while the legitimate clients are assigned higher priority levels. Once the request is accepted by the IP layer packet filter, the request is forwarded to the application. When the server sends a response to the client, it updates the client's priority level based on several application specific rules and parameters. For this purpose we use a benefit function B(rq) that estimates the benefit of a client's request rq. The benefit of a request takes into account the utility of the request and the resources expended in handling that request. For instance, if the request rq is a credit card transaction, then the utility of request rq could be the monetary profit the server obtains from the transaction. We also define a priority update function G that updates the priority level of a client based on the benefit B(rq).

In our first prototype, we propose to use a utility-based benefit function B(rq)=F(rt, ut), where rq denotes the client's request, rt is the time taken by the server to generate a response for the request rq, and ut denotes the utility of rq. We use a simple benefit function B(rq)=ut−γ*rt, where γ is a tuneable parameter. The response time rt is used as a crude approximation of the effort expended by the server to handle the request rq. Observe that in computing the benefit B(rq), the response time rt (that denotes the effort expended by the server) is subtracted from the request's utility ut.

The new priority level nprio could be computed as nprio=G (eprio, B(rq)), where eprio is the current effective priority level of the client. In our first prototype, we use an additive increase and multiplicative decrease strategy to update the priority level as follows: If B(rq)≧0, then nprio=eprio+α*B (rq), and nprio=eprio/(β*(1−B(rq))) otherwise. The additive increase strategy ensures that the priority level slowly increases as the client behaves benignly; while the multiplicative decrease strategy ensures that the priority level drops very quickly upon detecting a DoS attack from the client.

In summary, we perform request filtering at the server side IP layer or firewall 104. As we have pointed out earlier, filtering requests at the firewall 104 minimizes the amount of server resources expended on them. However, the parameter that determines this filtering process (the client's priority level) is set by the application. This approach is highly flexible, since it is possible to exploit application specific semantics and domain knowledge in computing the client's priority level.

Our implementation neither requires changes to the client side software nor requires superuser privileges at the client. We implement trust tokens using standard HTTP cookies. Hence, the client can use standard web browsers like Microsoft IE or FireFox to browse a DoS protected website in the same manner that it browses an unprotected website. An automated client-side script with support for handling HTTP cookies is assumed; such scripts are commonly used on the web today.

On the server side, we use NetFilters for filtering requests at the IP layer. NetFilters is a framework inside the Linux kernel that enables packet filtering, network address translation and other packet mangling. We use NetFilters to hook onto packet processing at the IP layer. Given an IP packet we check if it is a HTTP request and check if it has the tt cookie in the HTTP request header. If so we extract the trust token tt, check its validity and extract the priority level embedded in the token. We compute the effective priority level eprio from its priority level prio and the request rate r from the client. We use a simple weighted probabilistic fair queuing filter to rate limit requests from a client using its effective priority level (eprio).

We use Apache Tomcat filters to hook on HTTP request processing before an incoming request is forwarded to the servlet engine. This filter is used to record the time at which request processing starts. Similarly, a filter on an outgoing response is used to record the time at which the request processing ended. This filter provides the application programmers the following API to use application specific rules and domain knowledge to update the client's priority level after processing a request rq: priority updatePrio (priority oldPrio, URL requestURLHistory, responseTime rt), where oldPrio denotes the client's priority level before it issued the request rq, requestURLHistory denotes a finite history of requests sent from the client, and rt denotes the server response time for request rq. Additionally, this filter encrypts the trust token tt and embeds it as a cookie in the HTTP response.

We now describe three sample implementations of our API to demonstrate its flexibility.

We have presented a technique to update a client's priority level based on its request's response time and utility. Utility of the request can be computed typically from the requesting URL using application specific semantics and domain knowledge; note that client supplied parameters are available as part of the request URL. The response time for a request is automatically measured by our server side instrumentation.

Many e-commerce applications require inputs from users to follow certain implicit semantics. For example, a field that requests a client's age would expect a value between 1 and 100. One can use the client supplied parameters (that are available as a part of the request URL) to estimate the likelihood that a given request URL is a DoS attack or not. Naive DoS attack scripts that lack complete domain knowledge to construct semantically correct requests (unlike a legitimate automated client side script), may err on input parameter values.

In many web applications and web servers the semantics of the service may require the user to follow a certain link structure. Given that a client has accessed a page P, one can identify a set of possible next pages P1, P2, ..., Pk along with probabilities tp1, tp2, ..., tpk, where tpi denotes the probability that a legitimate client accesses page Pi immediately after the client has accessed page P. The server could lower a client's priority level if it observes that the client has significantly deviated from the expected behavior. Note that tracking a client's link structure based behavior requires a finite history of URLs requested by the client.

While heuristics like Input Semantics and Link Structure can guard the web server from several classes of application level DoS attacks, one should note that these heuristics may not be sufficient to mitigate all application level DoS attacks. For example, a DoS attacker may use requests whose cost is an arbitrarily complex function of the parameters embedded in the request. Nonetheless the Resource Consumption based technique provides a solution to this problem by actually measuring the cost of a request, rather than attempting to infer a DoS attack based on the request.

An adaptive challenge mechanism is now discussed. Client side implementation of the challenge server 108 is implemented in this embodiment using Java applets, while the challenge generator and solution verifier at the server are implemented using C. Although using Java applets is transparent to most client side browsers (using the standard browser plug-in for Java VM), it may not be transparent to an automated client side script. However, a client side script can use its own mechanism to solve the challenge without having to rely on the Java applet framework.

In another embodiment we exploit client-side computations made possible by JavaScripts to embed a weak authentication code into the TCP/IP layer of the networking stack in a client transparent manner. Unlike most authentication protocols that operate between peer layers in the networking stack, our protocol is asymmetric: it operates between the HTTP layer on the client and the IP layer on the server. HTTP level operation at the client permits our implementation to be client transparent, while IP level operation at the server allows packets to be filtered at the server's firewall.

In particular, we embed a 16-bit authenticator in the port number field of TCP packets. This is accomplished at the client's HTTP layer (web browser) using client transparent techniques such as JavaScripts. The server filters IP packets at the firewall based on the authentication code embedded in the destination port field of the packet. If the authentication code were valid, the server uses network address translation (NAT) port forwarding to forward the packet to the actual destination port (say, port 80 for HTTP). Hence, an unmodified server-side application can seamlessly operate on our DoS protected web server.

IP-layer Filtering. We embed a 16-bit authentication code in the destination port field of a TCP packet. This ensures that the authentication header is within the first 40 bytes of the IP packet and thus survives IP packet fragmentation. Hence, a firewall at the edge of the server's network can filter unauthenticated IP packets before they enter the network. Filtering packets at the firewall saves a lot of computing, networking, memory and disk resources which would otherwise be expended on processing the packet as it traverses up the server's networking stack.

Our proposed solution is client transparent, that is, a human being or an automated client-side script can browse a DoS protected website in the same way it browses an unprotected website. Our DoS protection mechanism does not require any changes to the client-side software or require superuser privileges at the client. All instrumentation required for implementing our proposal can be incorporated on the server-side, thereby making our proposal easily deployable.

Application Server Transparency. Our proposed solution is transparent to TCP and higher layers at the web server. Our instrumentation only modifies the IP layer at the firewall to incorporate the authentication check on the destination port field. This permits the web server to layer password and login or digital signatures based authentication protocols atop of our mechanism to achieve strong authentication and resilience to DoS attacks. The applications hosted by the web server can be oblivious to our DoS protection mechanism.

We describe a detailed implementation of our proposed solution on the Linux kernel. We present a detailed threat model on the web server and the clients. We assume that the web server(s) is honest. All web pages served by a web server are assumed to be valid and correct. However, one could build a feedback mechanism wherein the clients rate the service providers periodically. Over a period of time, clients would access only high quality service providers and the low quality service providers would eventually run out of business.

We assume that the clients may be dishonest. A dishonest client could reveal its authorization information to other unauthorized clients. We assume that the adversary controls a set of IP addresses. If an IP address is controlled by an adversary, then the adversary can receive packets sent to that address. On the other hand, if an IP address is not controlled by an adversary, then the adversary can neither observe nor modify packets sent to that address. Nonetheless, the adversary can always spoof the source IP address on a packet with any IP address that is not essentially controlled by the adversary. We assume a bounded strength adversary model. We assume that the adversary has a large, but bounded amount of resources at its disposal and thus, cannot inject arbitrarily large numbers of packets into the IP network. We assume that the adversary can coordinate activities perfectly to take maximum advantage of its resources; for example, all the compromised zombie computers appearing like a single large computer to the system.

Figure 5:
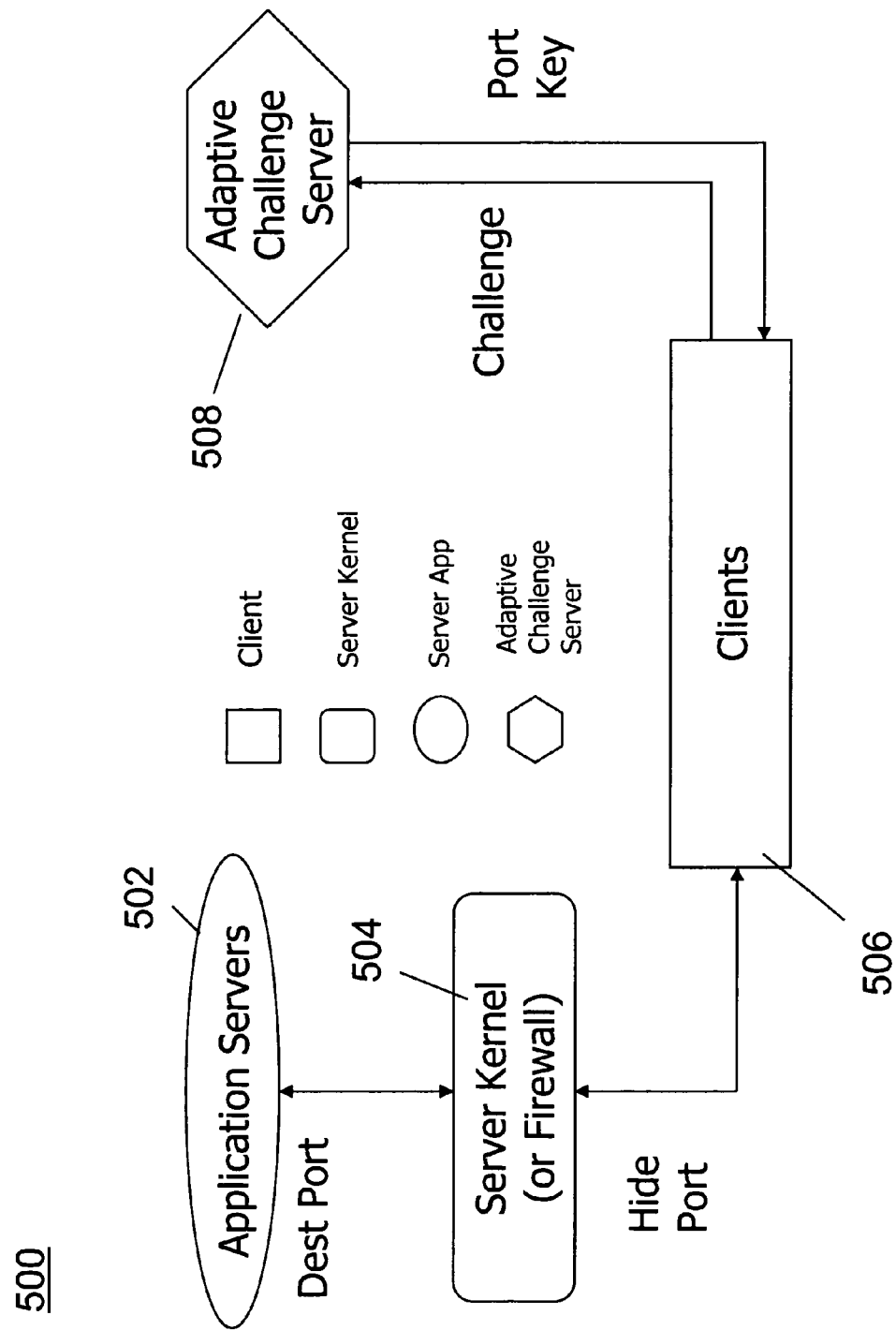
FIG. 5 shows a high level architecture of another embodiment of the invention.

FIG. 5 shows a high level architecture of a system 500 according to another embodiment. The system 500 comprises application servers 502, a server kernel (firewall) 504 coupled to the server 502, clients 506, and an adaptive challenge server 508. We achieve resilience to DoS attacks using admission control. Admission control primarily limits the number of concurrent clients 506 accessing the web server. We implement admission control using two components: challenge server 508 and the server firewall 504. The challenge server 508 limits the number of active port keys issued to clients 506. A client 506 can efficiently generate a correct authentication code only if it knows its port key. The client-side browser 506 then embeds the authentication code in its packet's destination port number field using JavaScript.

We use the server-side firewall 504 to filter IP packets from unadmitted clients 506. The packet filter at the server drops all non-TCP traffic. Further, it drops all TCP packets that do not have the correct destination port number. Hence, most of the packets sent by clients 506 that do not know their port key would be dropped by the firewall since the authentication check on the packet's destination port number fails. Filtering packets at the firewall 504 significantly reduces the amount of processing, memory, network, and disk resources expended on it. Processing power is saved because the packet does not have to traverse the server's networking stack; additionally, sending an illegal packet to the application layer 502 involves an expensive kernel-to-user context switch (typically, the application runs as a regular user).

Memory is saved because the dropped packet does not have to be allocated any space in the memory. If the incoming packet is a TCP SYN packet, network bandwidth is saved because the node (or web server) does not have to send a TCP SYN-ACK packet. Finally, some disk I/O may be saved. By not storing illegal packets in the main memory, the web server does not swap pages in/out of the main memory.

A client browsing a DoS protected website has to be capable of: (i) interacting with the challenge server 508, and (ii) embedding an authentication code in the TCP packet's destination port number field. We achieve both these functionalities in a client transparent manner using JavaScripts at the HTTP layer (web browser). Although we operate at the HTTP layer on the client-side, our protocol allows IP layer packet filtering on the server-side firewall 504. All our instrumentation is done at the server-side thereby making the deployment very easy. The instrumentation at the server-side includes the challenge server 508 and the firewall 504.

The challenge server 508 is used to bootstrap our system by delivering the port keys to admitted clients 506. A port key is used by a client 506 to compute the authentication code that would be embedded in the destination port number field of the TCP packets. Note that the challenge server itself cannot be protected against DoS attackers using port hiding. Hence, we use a cryptographic challenge-based defense mechanism to protect the challenge server 508 [X. Wang and M. Reiter, "Mitigating Bandwidth Exhaustion Attacks Using Congestion Puzzles," Proceedings of ACM CCS, 2004]. We make the challenge server 508 client transparent by providing a JavaScript to the client 506 that is capable of solving the cryptographic challenge. When the client 506 solves a cryptographic challenge correctly and if the system is capable of handling more clients 506, then the challenge server 508 would provide the client 506 with a port key. We ensure that solving a cryptographic challenge is several orders of magnitude costlier than the cost of generating the same.

The server-side firewall 504 is modified to perform two operations on incoming TCP/IP packets: (i) filter packets based on the target port number, and (ii) use probabilistic fair queuing to limit the rate at which packets are sent by a client 506. The firewall 504 is additionally instrumented to perform port forwarding: the firewall 504 modifies the destination port number on legitimate incoming packets to the application's real port number. Hence, the application layer 502 on the server-side can be agnostic to the underlying DoS protection mechanism.

Figure 6:
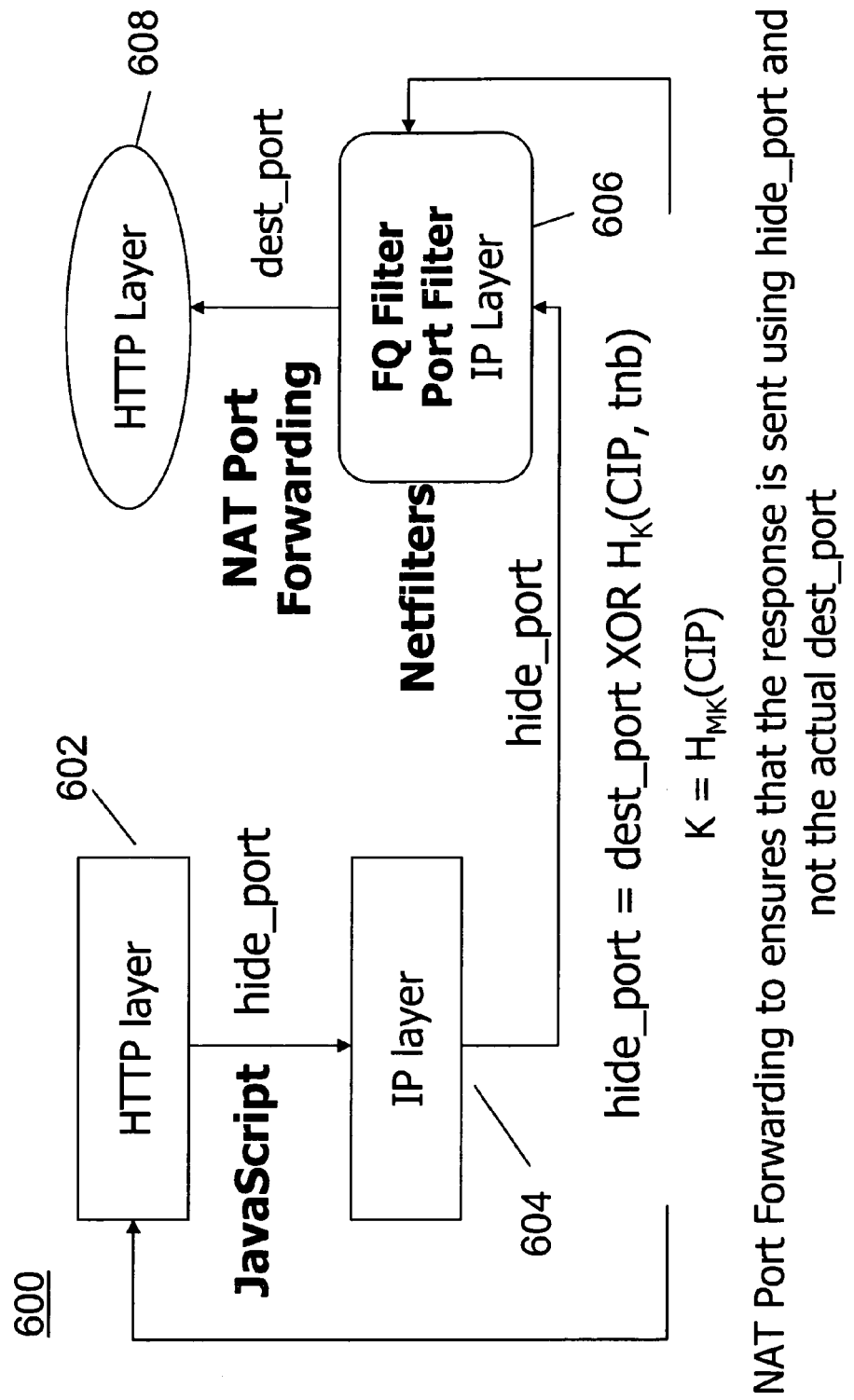
FIG. 6 illustrates a port hiding process.
Figure 7:
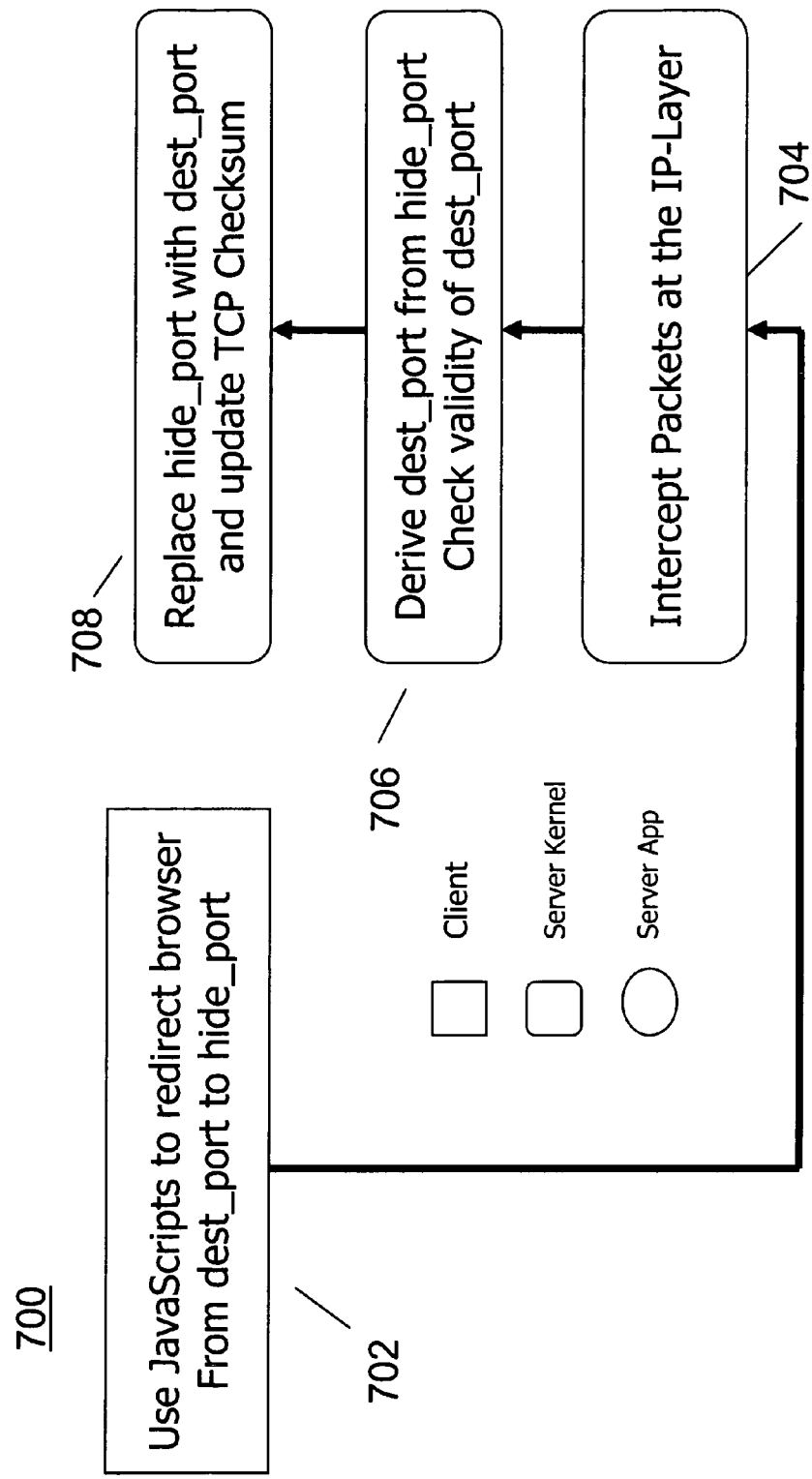
FIGS. 7 and 8 show a control flow diagram for port hiding.
Figure 8:
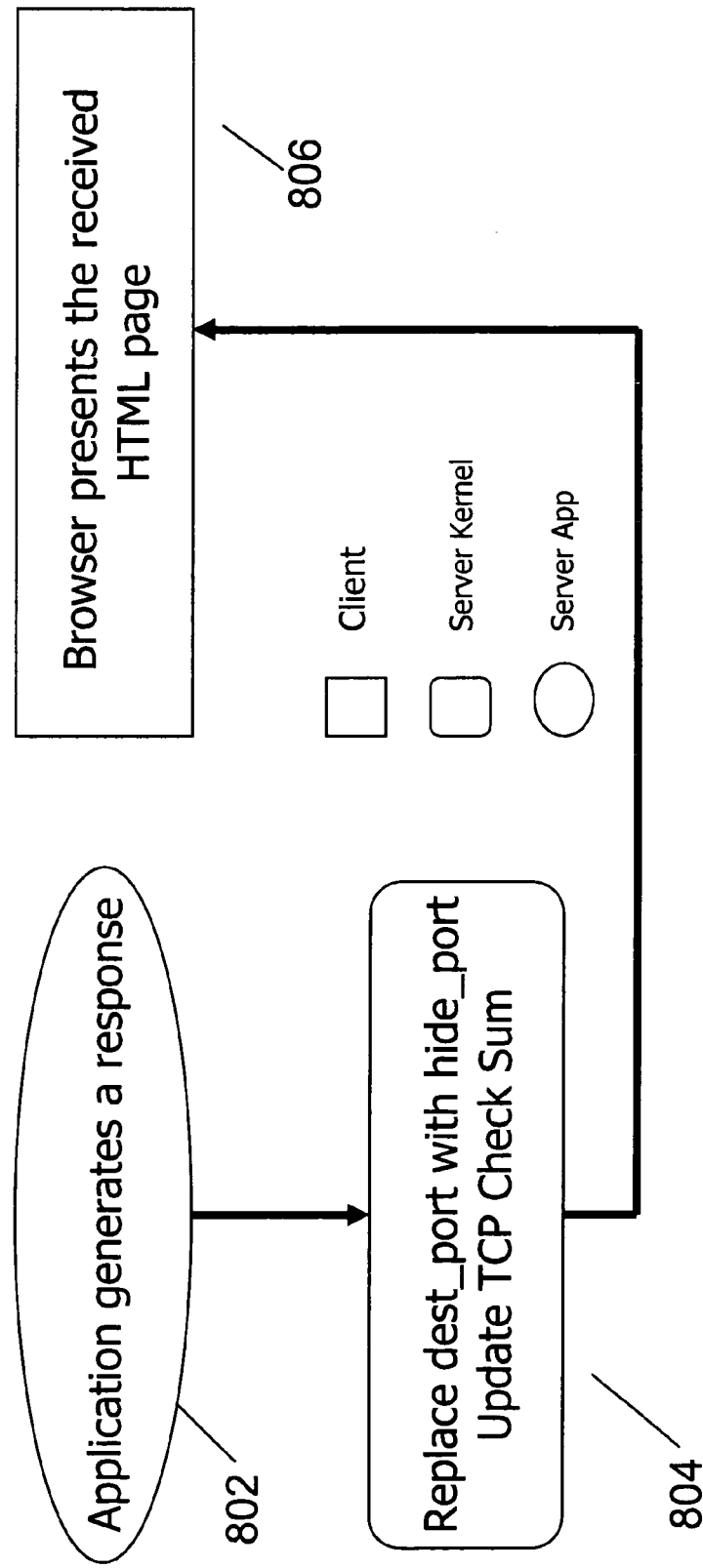

In this embodiment, a detailed design is provided for port hiding. FIG. 6 shows our architecture for port hiding and FIGS. 7 and 8 show the operational control flow for port hiding.

The actual destination port (dest_port) is transformed to an authenticated port (hide_port) using a keyed pseudo-random function (PRF) H of the client IP address (CIP), server IP address (SIP), and current time (t) (t is measured as the number of seconds that have elapsed since 1 Jan. 1970 GMT) using the port key K as: hide_Port=dest_port XOR HK(CIP, SIP, tnb). To account for loose time synchronization between the client and the server, we use tnb=t>>nb (instead of t); this allows a maximum clock drift of 2nb seconds. We describe our techniques to handle initial clock skew and clock drifts between the client and server below.

Observe that the authentication code (and thus hide_port) changes every tnb seconds. Hence, any adversary attempting to guess the authentication code has tnb seconds to do so. At the end of this time interval, the authentication code changes. Even if an adversary guesses the authentication code for one time period it has no useful information about the authentication code for its next period. We further make the authentication code non-transferable by ensuring that no two clients get the same port key.

We construct a client specific port key as K=HSK(t)(CIP), where the key K is derived from the client's IP-address (CIP) using a PRF H and a time varying server key SK(t). The time varying key SK(t) is derived from the server's master key MK as SK(t)=HMK(t/T), where T is the time period for which a port key is valid. The master key MK is maintained a secret by the web server. The admitted clients who possess the key K can send packets to the appropriate destination TCP port. Note that if hide_port were incorrectly computed, then the reconstructed dest_port'=hide_port XOR HK(CIP, SIP, tnb) at the server would be some random port number between 0 and 216-1. Hence, one can filter out illegitimate packets using standard firewall rules based on the reconstructed destination port number dest_port' (say using IP-Tables).

Note that port hiding only prevents unadmitted clients 506 from accessing the service. However, an admitted client 506 may attempt to use a disproportionate amount of resources at the server. We use fair queuing techniques to ensure that an admitted client 506 would not be able to consume a disproportionate amount of resources at the server. We add a fair queuing filter immediately above the port hiding filter, that is, all packets coming to this filter have the correct port number on it. Fair queuing ensures that as long as the client's packet arrival rate is smaller than the permissible or the fair packet rate, the probability of dropping the client's packet is zero. Hence, only packets from clients who attempt to use more than their fair share are dropped. It is particularly important not to drop traffic from honest clients, because honest clients use TCP and dropped packets may cause TCP to decrease its window size and consequently affect its throughput. On the other hand, an adversary may be masquerading TCP packets (say, using raw sockets); hence, a dropped packet would not affect an adversary as much it affects an honest client.

We now discuss an implementation of port hiding. Referring to FIG. 6, a port-hiding process 600 is shown. The client HTTP layer 602 sends' a JavaScript to the client IP layer 604, which sneds a hide_port message to the firewall netfilters 606. The netfilters 606 then forward the dest_port to the firewall's HTTP Layer 608.

Our implementation operates on both the client and the server. The client-side implementation uses common functionality built into most web browsers and thus does not require any additional software installation. The server-side implementation consists of a loadable kernel module that modifies the IP layer packet processing in the Linux kernel.

Port hiding on the client-side is implemented entirely using standard JavaScript support available in standard web browsers and does not require any changes to the underlying kernel. In fact, it appears that the destination port number is the only field in the underlying TCP packet that can be directly manipulated using the web browser.

Referring to FIG. 7, in step 702 we use simple JavaScripts to redirect a request to protocol://domain:hide_port/path_name instead of protocol://domain/path_name (usually port numbers are implicit given the protocol: for example, HTTP uses port 80). The port key is made available to the JavaScript by storing it as a standard HTTP cookie on the client browser. We compute hide_port from dest_port on the client-side using a JavaScript method for MAC (message authentication code) computation. Below we discuss techniques to handle the initial clock skew and clock drifts between the client and server. Using JavaScripts makes this approach independent of the underlying OS; also, JavaScripts are available as a part of most web browsers (Microsoft IE, Mozilla FireFox).

The server-side implementation of port hiding works as follows. The port hiding filter at the server operates at the IP layer in the kernel. In step 704, the server kernel intercepts packets at the IP-layer. In steps 706 and 708, the server-side filter uses (Network Address Translation) NAT port forwarding to forward the request from hide_port to the dest_port. Note that the client's TCP layer believes that it is connected to hide_port on the server. Hence, in all server responses we replace the source port from dest_port to hide_port so as to make the client believe that the packets are emerging from hide_port. We also appropriately change the TCP checksum when we change the packet's source or destination port. Note that updating the TCP checksum does hot require us to scan the entire packet. We can compute the new checksum using the old checksum, dest_port and hide_port using simple 16-bit integer arithmetic. We implement these IP-layer filters using NetFilters, a framework inside the Linux kernel that enables packet filtering, network address translation and other packet mangling.

Referring to FIG. 8, in step 802 the application at the server generates a response to a request for service. In step 804 the firewall replaces the dest_port with a hide_port and updates the checksum. Then in step 806, the client browser presents the received HTML page.

Additionally, we need every web page served by the server to include a call to the JavaScript that implements port hiding at the client side. One option would be to change all static web pages and the scripts that generate dynamic web pages to embed calls to the port hiding JavaScript. However, we believe that such an implementation would not be feasible. We dynamically modify the HTTP response to insert calls to JavaScripts in a web server using server-side include (SSI). SSI permits us to efficiently inject small additions to the actual HTTP response generated by the web server.

We tolerate clock skew and clock drift between clients and the server as follows. First, when the client contacts the challenge server to get the port key, we compute the initial time difference between the client's clock and the server's clock. We include this initial clock skew as a cookie in the HTTP response that includes the client's port key. The client-side JavaScript that updates the authentication code periodically uses the initial clock skew to synchronize the client's local time with that of the server. Assuming that clock drifts are negligibly small, accounting for the initial clock skew is sufficient.

One can additionally tolerate small amounts of clock drifts as follows. The server can update the clock skew cookie each time it sends a HTTP response to the client. Assuming that the clock drift between the client and server does not grow significantly between two successive HTTP responses from the client, a client would be able to compute the correct authentication code. However if the client's think time between successive HTTP requests is very large, then it might be possible that the client's clock drifts more than the permissible level. Even in that case, a client sending IP packets with incorrect authentication headers (destination port number) would be automatically redirected to the challenge server. On solving the challenge, the challenge server would update the cookie that contains the clock skew between the client and the server.

Figure 9:
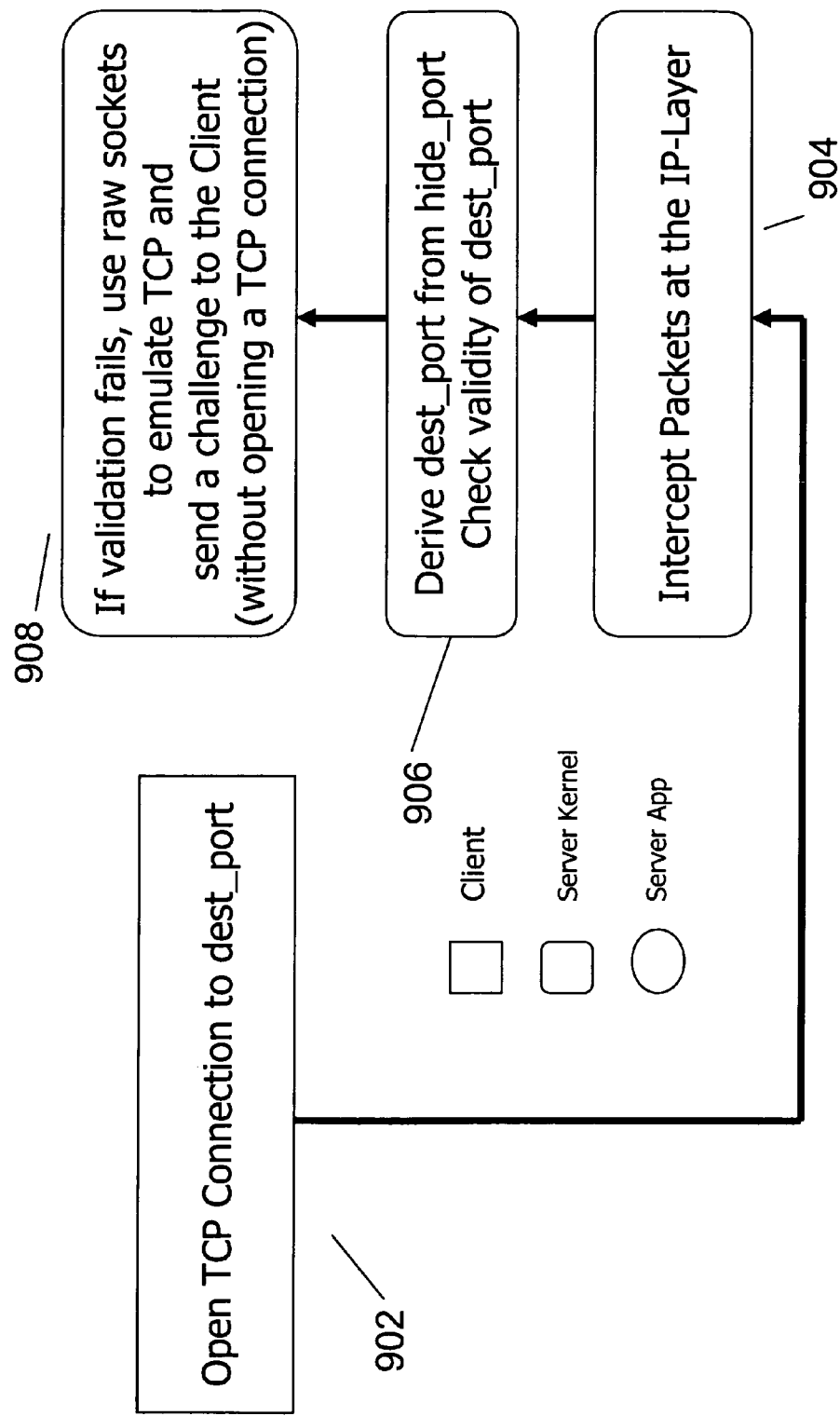
FIGS. 9 and 10 show a control flow diagram for a challenge server.
Figure 10:
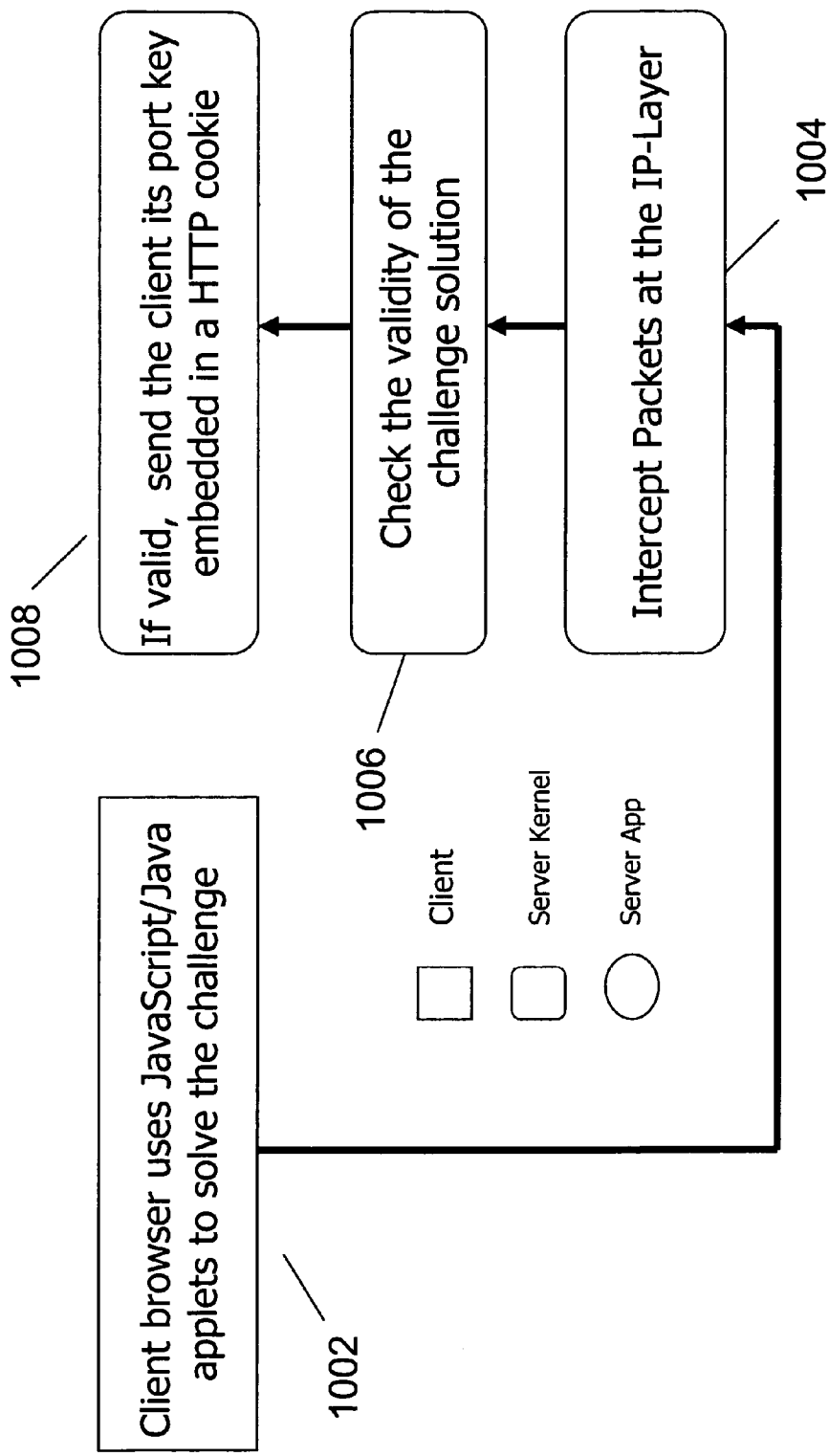

We now discuss the design of our challenge server. FIGS. 9 and 10 show the detailed control flow of the challenge server. Referring to FIG. 9, in step 902 the client opens a TCP connection to the dest_port. Then, in step 904 the firewall intercepts packets at the IP layer. In step 906, the firewall derives the dest_port from hide_port and checks the validity of dest_port. In step 908, if the validation fails the firewall uses raw sockets to emulate the TCP and sends a challenge to the client (without opening a TCP connection).

Referring to FIG. 10, in step 1002, the client browser uses JavaScript/Java applets to solve the challenge. In step 1004, the firewall intercepts the packets at the IP layer. In step 1006, the validity of the challenge solution is checked. In step 1008, if valid, the firewall sends the client its port key embedded in an HTTP cookie.

The challenge server facilitates client transparent port key delivery to the client. This is accomplished by ensuring that the URL of the website refers to the challenge server. In other words, a DNS (Domain Name Service) lookup on the URL's domain name would return the IP address of the challenge server. Hence, a client's first access to the website is automatically directed towards the challenge server. Additionally, when a client sends packets with incorrect port numbers, it is redirected to the challenge server. This is required to ensure that clients that experience large clock drifts can continue to access the web server.

The challenge server sends a cryptographic challenge to the client along with a JavaScript to solve the challenge. The client-side browser can use the JavaScript to solve the challenge. Note that performing client-side computation can significantly throttle the DoS attackers. We have implemented an adaptive challenge algorithm that is similar to the one described above. On solving the challenge correctly, the challenge server 508 sends the port key and initial clock skew as standard HTTP cookies to the client-side browser. Further, the challenge server 508 automatically redirects the client to the web server using HTTP redirect. All further requests from the client are forwarded to the web server by the server-side firewall after it verifies the authentication code (destination port number) on the IP packet.

Note that the challenge server cannot be protected using port hiding. Hence, we need to ensure it is very hard to launch DoS attacks on the challenge server. For this purpose, we run the challenge server atop of raw sockets that partially emulate a TCP connection using a stateless TCP/IP server approach. This makes our challenge server resilient to TCP level attacks such as SYN floods and SYN+ACK floods that attempt to exhaust the number of open TCP connections on the web server.

Client-side implementation of the challenge server uses Java applets, while the challenge generator and solution verifier at the server are implemented using C. Although using Java applets is transparent to most client-side browsers (using the standard browser plug-in for Java VM), it may not be transparent to an automated client-side script. However, a client-side script can use its own mechanism to solve the challenge without having to rely on the Java applet framework.

We have so far assumed that one client IP-address corresponds to one client. However, such an assumption may not hold when multiple clients are behind a client-side proxy. In this case, several clients would share the same IP address. The key problem in handling such clients are as follows: (i) our authentication header is a function of the client IP address, which in this case would refer to the IP address of the proxy. Hence, our fair queuing filter will not be able to distinguish requests coming from different clients behind a proxy, and (ii) a client browser behind a firewall may not know the IP address of the proxy which is essential for computing the hide_port. Note that using the client's private IP address would result in an invalid hide_port.

A closer look a the client-side IP network address translator (NAT) shows that client-side proxies use port address translation (PAT) to multiplex multiple clients on the same IP address. PAT works by replacing the client's private IP address and original source port number by the proxy's public IP address and a uniquely identifying source port number. When a packet comes back from the Internet to the proxy, the proxy uses the unique destination port number (in the response packet source and destination ports would have been swapped) to determine the client's private IP address and port number.

We modify the per client key generation to include the client's IP address and port number as: K=HSK(t)(CIP, CPN), where CIP denotes the IP address of the proxy and CPN refers to the client's translated port number as assigned by the proxy. The client uses key K to derive hide_port from dest_port. Note that for clients that have a public IP address, CIP would refer to the IP address of the client and CPN would refer to its actual port number.

While the above solution permits clients behind proxies to operate, it opens up an interesting problem. It permits one malicious client to pretend as if there were several clients behind its firewall. Note that our fair queuing filter divides the server resources uniformly amongst all clients. However, if one malicious client were to pretend to be 100 clients, then it would get 100 times its fair share of server resources. However, a malicious node pretending to be multiple clients behind a proxy has to pay a heavy cost at the challenge server. Recall that we use a compute intensive challenge response protocol to initialize the client key. A malicious client pretending to be 100 different clients would have to solve 100 challenges to obtain the client keys associated with those 100 fictitious clients. This would largely discourage a malicious client from imitating several fictitious clients behind a proxy.

We now discuss qualitative analysis of our basic port hiding design. We then refine our basic design based on this qualitative analysis to arrive at our final design.

Since the size of our authentication code is limited to N=16 bits, a malicious client may be able to discover the destination port corresponding to its IP address with non-trivial probability. Assuming an ideal pseudo-random function (PRF) H, all possible N-bit integers appear to be a candidate hide_port for a malicious client. For any non-interactive adversarial algorithm, it is computationally infeasible to guess a correct hide_port with a probability greater than $2^{-N}$.

Hence, a malicious client is forced to use an interactive adversarial algorithm to guess the value of hide_port. The malicious client may choose a random N-bit integer rand_port as the destination port number. The client can construct a TCP packet with destination port rand_port and send the packet to the web server. If the client has some means of knowing that the packet is accepted by the filter, then the client has a valid hide_port=rand_port. One should note that even if a malicious client successfully guesses the value of hide_port, that value of hide_port is valid only for the current time epoch. At the end of the time epoch, the malicious client has to try afresh to guess the new value of hide_port. Also observe that using the valid hide_port value for one epoch does not give any advantage to a malicious client that attempts to guess the hide_port value for the next epoch.

Assuming that the client cannot directly observe the server, the only way for the client to know whether or not the packet was accepted by the firewall is to hope for the web server to respond to its packet. Sending a random TCP packet does not help since the web server's TCP layer would drop the packet in the absence of an active connection. Hence, the malicious client has to send TCP SYN packets with its guess for hide_port. If the web server responds with a TCP SYN-ACK packet then the client has a valid hide_port.

Note that since all N-bit integers appear equally likely to the valid hide_port, the malicious client does not have any intelligent strategy to enumerate the port number space, other than choosing some random enumeration. Clearly, a randomly chosen hide_port has a 1 in 2N chance in succeeding thereby reducing the adversarial strength by a huge order of magnitude. Cryptographically, a probability of one in 65,536 (N=16) is not considered trivially small; however, our techniques can control the rate at which an adversary can break into our system. Observe that the only way a malicious client can possibly infer a valid hide_port is by probing the server with multiple SYN packets and hoping to receive a SYN-ACK packet from the web server. Now the server could flag a client malicious if it received more than a threshold r number of SYN packets per unit time with an incorrect destination port from the client. Note that one can use our fair queuing filter to rate limit the number of SYN packets per client.

However, the technique described above suffers from a drawback. Let us suppose that a malicious client knew the IP address of some legitimate client C. The malicious client could flood the web server with more than r SYN packets per unit time (with randomly chosen destination port numbers) with the packet's source IP address spoofed as CIP, where CIP is the IP address of client C. Now, the firewall would flag the client with IP address CIP as malicious. Hence, all packets sent from the legitimate client C in the future could be dropped by the firewall.

One can circumvent the problem described above using SYN cookies as follows. The web server now responds to all SYN packets (irrespective of whether or not they match the destination port number) with a SYN-ACK packet. The web server encodes a cryptographically verifiable cookie in the TCP sequence number field. When the client sends a TCP ACK packet, the server verifies the cookie embedded in the TCP sequence number field before opening a TCP connection to the client. In addition, the firewall checks the destination port number for all packets except the TCP SYN packet. If a malicious client were to spoof its source IP address in the TCP SYN packet then it would not be able to send a TCP ACK packet with the matching cookie (sequence number) if the IP address CIP is not controlled by the adversary. Recall that our threat model assumes that an adversary would not be able to observe or corrupt any packets sent to an IP address that is not controlled by the adversary. Hence, using SYN cookies eliminates all ACK packets that contain a spoofed source address that is not controlled by the adversary. Now the web server, instead of limiting the number of SYN packets per unit time, would limit the number of ACK packets per unit time. Clearly, the modified technique ensures that an adversary cannot coerce the firewall into dropping packets sent from a legitimate client C.

However, the adversary could still flood the web server with unlimited numbers of SYN packets. The protocol expects the web server to respond with a SYN-ACK packet for all SYN packets irrespective of whether or not the SYN packet matches the authentication code embedded in the destination port number field. One can mitigate this problem by putting an upper bound on the number of SYN packets accepted from a client to at most r SYN packets per unit time. Using a finite r permits the adversary to coerce the web server to drop packets from a legitimate client. For instance, a malicious client may spoof the source IP address with CIP and send more than r SYN packets per unit time. Clearly, as r increases, it becomes more expensive for an adversary to do so. However, as r increases, the bad clients would be able to flood more SYN packets to the web server. Allowing more SYN packets per unit time permits a bad client to guess its correct hide_port. Hence, the parameter r must be carefully chosen by the web server.

Therefore, while there have been described what are presently considered to be the preferred embodiments, it will understood by those skilled in the art that other modifications can be made within the spirit of the invention.

We claim:

1. A method for processing a plurality of requests in a client-server system, the method comprising steps of:

receiving at least one request from a client at a server;

computing a trust level score for the client based on the at least one request wherein said trust level score is based on an amount of resources expended by the server in handling the at least one request such that a higher trust level score is computed for requests consuming less system resources;

assigning the trust level score to the client based on the at least one request;

embedding the assigned trust level score in a hypertext transfer protocol trust cookie included in all responses sent from the server to the client, wherein the trust cookie comprises a client IP address, a server IP address, a time at which the trust cookie was issued, and the assigned trust level score;

serving the client presenting a valid trust cookie at a priority level associated with the assigned trust level score;

for the client with a low assigned trust level score, limiting a number of requests that said client can issue per unit of time; and dropping any request from a client with no trust cookie or an invalid trust cookie.

2. The method of claim 1, further comprising modifying the assigned trust level score provided to the client based on a subsequent request.

3. The method of claim 1 wherein the trust cookie further comprises a flag denoting a sentinel.

4. The method of claim 1 wherein the trust cookie further comprises a secret cryptographic key.

5. The method of claim 1 wherein the trust cookie further comprises a symmetric key encryption algorithm.

* * * * *